United States Patent Office 3,533,962
Patented Oct. 13, 1970

3,533,962
MULLING PRECURSOR FOR CRACKING
CATALYST
Lee A. Cosgrove, West Chester, Pa., assignor to Air
Products and Chemicals, Inc., Philadelphia, Pa., a corporation of Delaware
No Drawing. Filed June 14, 1965, Ser. No. 463,860
Int. Cl. B01j 11/40
U.S. Cl. 252—455                        2 Claims

ABSTRACT OF THE DISCLOSURE

A five-component mixture includes raw kaolin powder and water. Sodium oxide is present so that the alkaline solution, prior to kaolin addition, is about 5 normal with respect to sodium hydroxide. Meta-kaolin is employed in an amount of the same order of magnitude as the sodium oxide. Partially mullitized kaolin is present in an amount about six times the amount of meta-kaolin. Said five-component mixture is processed in a high-pressure mulling apparatus. The mulling transforms the damp powder into a plastic dough. After such transformation to a plastic dough, the composition is extruded, cut into pellets, immersed in an inert oil, and subjected to a plurality of aging steps to yield particles comprising a kaolin matrix and a sodium crystalline zeolite distributed throughout such matrix. Cracking catalyst particles are prepared therefrom by ion-exchange followed by calcination. Such cracking catalyst particles comprise crystalline zeolite throughout a matrix of calcined kaolin and have acceptable attrition resistance and impact resistance. In the absence of the controlled mulling step, extrusion is not reliable and the few particles successfully extruded possess inferior attrition resistance and inferior impact resistance.

---

This invention concerns the manufacture of cracking catalyst particles having an attractive combination of activity, selectivity, and stability, and having the further important advantage of maintaining substantially initial particle size after being subjected to repeated impact and repeated grinding treatments. The advantageous hardness of the particles is conveniently described as a combination of prolonged impact resistance and prolonged attrition resistance.

Dehydrated crystalline zeolites are designated as molecular sieves. As explained in a group of patents issued to Dzierzanowski et al. 2,992,068, 3,065,054, 3,094,383, 3,100,684 and 3,112,176 several types of useful products partaking of the nature of molecular sieves may be obtained by subjecting compositions comprising metakaolin and sodium hydroxide to controlled recrystallization treatments. Recent publications have shown that several research laboratories have prepared cracking catalysts derived from a precursor conveniently designated as an appropriate large pore crystalline hydrogen zeolite incorporated with a predominant amount of porous refractory carrier. Several cracking catalysts containing such large pore zeolitic components apparently have had a combination of activity, stability, and selectivity, superior to the non-sieve type of cracking catalysts utilized commercially in recent decades. Chemical stability of a cracking catalyst (retention of attractive selectivity and activity after production of many barrels of gasoline per pound of catalyst) must be distinguished from physical stability of catalyst particles. An experimental catalyst can fail to advance toward commercial usage merely because of softness impairing its ability to withstand mechanical forces during an acceptable period of catalyst life. Previous workers have encountered numerous difficulties in efforts to develop a method for preparing sieve-type cracking catalyst particles having a sufficient attractive combination of properties such as impact resistance, attrition resistance, selectivity, activity, and stability to meet the requirements for a profitable catalyst for a cracking unit.

Extrusion of aqueous compositions consisting predominantly of kaolin clay normally proceeds satisfactorily. Alkali often-times serves as a plasticizing agent effective in imparting greater plasticity to compositions. During the experimental program leading to the present invention, it was not feasible to extrude certain compositions having advantageous combinations of ingredients for subsequent crystallization steps, the performance of the composition being unreliable and erratic. Without reliable extrustion, the composition, and/or products derived from recrystallization and/or further processing thereof, had no value to a petroleum refiner or catalyst manufacturer.

In accordance with the present invention a plurality of dry powders are dry blended to assure an intimate admixture and uniform distribution of the components. The dry blended mixture is then wet blended with an aqueous alkaline solution such as a solution of sodium hydroxide, such wet blending being in a muller having a pressure roller crushing components against the bottom of a pan. The high pressure within the muller forces the components of the dry blend to be squeezed into intimate contact with each other and with the aqueous solution. The water content of the mixture and the duration of the mulling operation must be sufficient to transform the mixture into a plastic dough-like composition which can be shaped into particles suitable for additional treatment as a bed of particles. Such mulling time is within a range from about 5 to about 50 minutes. If the alkaline solution and dry-blended clay composition are pre-mixed in a pugmill or other suitable apparatus, then it is easier to achieve the desired plasticity during a shorter mulling time. However, the impact resistance of the cracking catalyst particle is hopelessly impaired if the mixture is shaped into particles without mulling or equivalent high pressure mixing. The high pressure squeezing of the muller alters the plasticity of the dough-like mixture so that adequately hard pellets are obtained from the particle shaping step if, but only if, the muller is employed and used for a sufficient period of time. The plastic composition may be extruded into spaghetti-like strands which are cut into granular pellets. Granular catalyst for gravitating bed procedures may be prepared from such pellets. The present invention is particularly concerned with the attainment of reliable extrusion by transforming the mixture into a plastic dough by adequate mulling prior to extrusion. In the absence of such prior high pressure mulling, the alkaline aluminosilicate mixture is not extrudable.

The particles are immersed in an organic liquid bath (conveniently designated as an oil bath) adapted to minimize any evaporation of water from a particle, and thereafter aged at a temperature in the range from about 10 to about 40° C. (i.e., ambient conditions in the factory) for about a day (e.g., about 8 to 40 hours) to initiate the recrystallization within the particle. This aging of the shaped particle in the oil bath initiates the recrystallization and minimizes the difficulties encountered in the hydrothermal recrystallization at an elevated temperature. The oil for such aging steps may be a kerosene type product or may be as high boiling as a light lubricating oil but should not contain groups (e.g., $-CO_2H$) reactive with aqueous alkali at the aging conditions and/or imparting significant solubility in or for water. The ambiently aged particles and oil bath are heated to a temperature in the range from about 80° C. to about 95° C. and maintained at such hydrothermal conditions for a period from about 8 to about 40 hours, or approximately one day. The treatment is designated, not as thermal, but as hydrothermal, because of the approximately 22% moisture content of the particles. The oil is removed from the hydrothermalized particles, which are then treated with a hot solution of an ammonium salt(e.g., NH₄NO₃) containing a quantity of ammonium ion which is from 150% to about 900% of the amount stoichiometrically required for complete exchange of the sodium by ammonium ion, whereby the weight of residual sodium is reduced below about 1.0% by weight. As long as a large excess of ammonium ion is employed, the product is designated as an ammonium zeolite without regard to the residual sodium content. In a series of preparations using 600% excess ammonium nitrate the residual sodium oxide content was within a range from 0.5 to 0.9% averaging about 0.7%, but a similar range might be reached by a larger or smaller excess, depending on process conditions. The thus prepared particles, comprising a clay support and incorporating ammonium zeolite, are then treated in an atmosphere comprising from 30% to 100% steam at a temperature such as 740° C. and within the range from about 650° C. to about 850° C. for from about one hour to about fourteen hours, whereby steam and ammonia are driven from the particles, whereby hydrogen zeolite is formed in such particles, and whereby the cracking catalyst is stabilized. Such steamed particles posses advantageous impact resistance. The term "hydrogen zeolite" is intended to embrace any heat-treated ammonium zeolite which is sufficiently acidic that its acidity can be measured by any of the standard tests for measuring the acidity of silica-alumina cracking catalysts. Only the acid sites most resistant to thermal deactivation survive the stabilization treatment. The steam-stabilized particles are then cooled and are available for use as cracking catalyst particles.

Various procedures involving steaming and cooling of ammonium zeolites to prepare hydrogen zeolite cracking catalysts have been described in cracking catalyst literature for about 30 years and it has long been recognized that some acid anhydride formation, cross-linking of non-regenerable acid sites, decrease of ion-exchange capacity, etc., accompanies such steaming of ammonium zeolites. Terms such as "decationization" also describe such phenomena.

The performance of previously marketed cracking catalysts is adequately described in technical journals and provides a base from which improvements may be measured. The performance of the cracking catalysts herein was evaluated by a standard procedure. To eliminate any possible difficulty in duplicating the results set forth herein, details for the catalyst testing are set forth.

CATALYST EVALUATION PROCEDURE

The apparatus and procedure for measuring the activity of a catalyst incorporated most of the features of the Cat A test (article by J. Alexander and H. G. Shimp, page R537, National Petroleum News, Aug. 2, 1944) but using 10% steam with the charge, using steam instead of nitrogen in the preheat and purge, using 900° instead of 800° F., using a 15 minute instead of 10 minute run (1.0 instead of 1.5SR), and using other similar modifications. Unless otherwise noted, the Cat A apparatus and procedure carry over into the improved analytical procedure described and employed herein.

An electrically heated tubular furnace is positioned vertically around a preheater and a catalyst case. The catalyst case is a glass tube about 2.8 cm. diameter and about 48 cm. in height, having a capacity of about 220 ml. and filled with exactly 200 ml. of catalyst granules between upper and lower screens. Spherical joints connect the bottom of the catalyst case with a Graham type condenser about 48 cm. high, which discharges the condensate into a 75 ml. flask. Both the flask receiver and condenser are cooled to maintain surface temperatures near 15.6° C. (60° F.). Gaseous effluent leaving the receiver is collected in a gas receiving bottle over water. A water-cooled burette is adjusted to direct a stream providing 50 ml. of gas oil during the exactly 15 minute run, so that the v./v./h. space rate is one. The catalyst to oil ratio is 4 to 1. Steam is pre-heated to about 510–530° C. but cools to a lower temperature before contacting the pre-heater, which is maintained at about 501.7° C. (935° F.) during the 10 minute pre-heat, 15 minute run, and 5 minute purge. The steam passes through the catalyst bed during all of the 30 minutes of the activity test, and constitutes 10% by weight of the gas oil during the testing of the catalyst. The pre-heaer contains inert granules.

The apparatus required for the regeneration of the catalyst includes the vertical tubular furnace, a pre-heater and catalyst case previously described plus: a catalytic purifier maintained at about 510° C. and adapted to burn the carbon monoxide to carbon dioxide over a copper oxide on clay catalyst; and a flask containing soda-lime for absorbing all the carbon dioxide in the regeneration gas stream.

The synthetic crude collected in the receiver is distilled through an insulated packed column to measure in a water cooled (15.6° C. or 60° F.) graduate the volume of 210° C. (410° F.) end boiling point gasoline is distilled during from 40 to 60 minutes.

Temperatures in the catalyst bed and pre-heater are continuously scanned by a recording potentiometer intermittently receiving signals from each of several thermocouples.

The charge stock is a standard gas oil obtained from an East Texas crude distilled to recover 45–83% by volume. The bulk supply of this gas oil is checked periodically to assure it retains its standard characteristic for continued use in evaluation of cracking catalyst. This gas oil in the indicated amount flows from the burette to the pre-heater in which the gas oil vapors and steam become a more uniform down-flowing gas stream. The gas oil is cracked by the catalyst, and the vapors are condensed to a synthetic crude collected in the receiver. Distillation provides the measurement of the volume of gasoline produced by the 900° F. cracking. Gas density and the percent of coke formed in the catalyst are also measured.

An evaluation of a catalyst involves a plurality of runs so that a majority of runs and at least three runs have gasoline yields agreeing within a range of 1.5% and coke yields within a range of 0.3%.

The catalyst activity test using 10% weight steam at (900° F.) 482.2° C. has proven to correlate more satisfactorily with industrial cracking performance and to have other advantages over the Cat A test.

The nature of the present invention is better understood by reference to a plurality of examples.

EXAMPLE 1

As explained in Haden et al. 3,100,684, kaolin clay embraces hydrated alumina disilicates in which the $H_2O/Al_2O_3$ unit ratio is within the range from about 2 to about 4, or a hydrated water content of about 14 to 24% by weight. Kaolin which has been cleaned but not calcined is conveniently designated as plastic kaolin without regard to the ease of preparing aqueous plastic dough therefrom and without regard to particle size.

Kaolin from many mines contains sufficient iron-type of contaminants to be unsuitable for white porcelain, and most of the white kaolins contain more oxide of iron than is permissible in a cracking catalyst. It has been customary to schedule for cracking catalyst end use only those kaolin clays containing merely a few parts per million of iron oxide, and this precaution of the prior art technology can be implied into any description of making cracking catalyst from kaolin. In mining clay it is customary to remove gravel and debris at an early stage of processing. Because particular markets, such as paper sizing, require small (e.g., 0.001 to 1 micron) particle size kaolin, such materials sometimes can be removed profitably from raw clay prior to segregation of a cracking catalyst grade of kaolin having particles of a diameter range such as 1 to 10 microns, many being about 5 microns.

Meta kaolin has been prepared by heating any grade of kaolin at conditions sufficient to remove most but not all of the water of crystallization, so that its loss upon severe calcination is within the range from about 0.3% to about 2% by weight. In making a cracking catalyst, the meta kaolin is desirably derived from a cracking catalyst grade of kaolin.

Mullite is a synthetic crystalline aluminosilicate produced by severe calcination of any of many aluminosilicates, and "partial mullitizing" is a generic term for severe calcination of aluminosilicates without regard to the presence or absence of mullite. The term "calcined meta kaolin" describes a product prepared by calcining kaolin and/or meta kaolin at conditions sufficiently severe to reduce the content of water of crystallization to below 0.3%. In making a cracking catalyst, the "partially mullitized kaolin" or "calcined meta kaolin" is desirably derived from a cracking catalyst grade of kaolin.

Meta kaolin contains from about 0.3% up to about 2% by weight $H_2O$, so that the unit ratio for $H_2O/Al_2O_3$ is generally below about 0.25 and is prepared by heating kaolin clay at a temperature between about 420° C. and about 870° C. for a time sufficient to remove from about 87% to about 98% of its hydrate water content, that is, to a volatilizable matter content within a range about 0.3 to about 2% by weight. Such meta kaolin is a commercially available material marketed as Pigment 33 by the Floridin Company. A partially mullitized kaolin is a commercially available material marketed as "Satintone No. 1" by Minerals and Chemicals Philipp Corp. Mixtures of meta kaolin and partially mullitized kaolin are attainable by appropriate control of time and temperature patterns of processing, but advantages are obtained by preparing mixtures of the separately manufactured products.

A dry blend of plastic kaolin, partially mullitized kaolin, and meta kaolin is prepared as follows, the quantities being those intended to yield, in view of mechanical and other losses, about 100 kg. of cracking catalyst:

|  | Kg. |
|---|---|
| Plastic kaolin | 73.09 |
| Partially mullitized kaolin | 31.33 |
| Meta kaolin | 5.22 |
| Dry blend | 109.64 |

An aqueous solution containing about 17.8% by sodium hydroxide (about 5 normal, about 1.19 density or about 21.5 $H_2O/Na_2O$ ratio) is prepared, and admixed with the three component clay in a conventional ribbon blender. The initial paste resulting from conventional mixing of 42.12 kg. of solution (containing 5.82 kg. $Na_2O$) and 109.64 kg. of clays is a composition which ceramic engineers would expect to extrude easily. Mixtures of kaolin clay and water have been extruded and shaped as a plastic clay so satisfactorily as to be a standard of comparison. Aqueous sodium hydroxide has long been recognized as imparting ease of extrusion to clays. The combination of plastic clay and aqueous sodium hydroxide would be expected to provide easy extrusion. However, persistent efforts by extrusion experts failed to achieve satisfactory extrusion with the 151.76 kg. of mixture. Sometimes the extruder would clog with a hard, difficultly removable cake. Sometimes the extruded material was powdery and readily crumbled. Even when only the apparently strong pellets from the preliminary attempts at extrusion were calcined and processed, the pellets were extremely sensitive to impact and readily shattered by the air jet test. Because no reliable and predictable extrusion was attainable from said mixture, no catalyst manufacturing method, featuring such mixture was possible.

Particular attention is directed to the feature of employing high pressure to transform the alkalinized clay into a plastic dough having a composition (summation of previous data) as follows:

| | | |
|---|---|---|
| $Na_2O$ | | 5.82 |
| Alumina disilicate: | | |
| Plastic kaolin | 62.90 | |
| Partially mullitized kaolin | 31.23 | |
| Meta kaolin | 5.19 | |
| Total aluminum disilicate | 99.32 | 99.32 |
| Water: | | |
| $H_2O$ from aluminum disilicate | 10.33 | |
| From NaOH | 1.69 | |
| Solution | 34.61 | |
| Total $H_2O$ | 46.63 | 46.63 |
| Total dough | | 151.77 |

The moles of components in such composition corresponds to:

| | |
|---|---|
| 0.447 | $Al_2O_3$ |
| 0.895 | $SiO_2$ |
| 0.0937 | $Na_2O$ |
| 2.595 | $H_2O$ |

Zeolites are conventionally evaluated with reference to the presence of one mole of alumina so these proportions provide:

| | |
|---|---|
| $Al_2O_3$ | 1.00 |
| $SiO_2$ | 2.00 |
| $Na_2O$ | 0.21 |
| $H_2O$ | 5.80 |

The unit mole ratios for the dough are as follows:

| | |
|---|---|
| $Na_2O/Al_2O_3$ | 0.21 |
| $SiO_2/Al_2O_3$ | 2.0 |
| $H_2O/Na_2O$ | 27.6 |
| $H_2O/Al_2O_3$ | 5.80 |
| $Al^{+++}/Na^+$ | 4.77 |

If the partially mullitized silica were treated as a mixture of silica, mullite, and meta kaolin, and if the mullite were then ignored, some of the ratios would then be different from those based upon the more valid assumption that no portion of the reaction mixture is absolutely inert in the reaction.

The high pressure mixing must be continued for from 5 to 50 minutes in order to transform the initial mixture into a plastic composition suitable for reliable extrusion. Only if such plasticity is achieved by adequate high pressure mixing prior to extrusion is it feasible to achieve a cracking catalyst possessing satisfactory impact resistance. Although commercially acceptable catalysts can be prepared by mulling the dough for prolonged periods up to about 50 minutes, it is generally not desirable to continue the mulling for more than about 30 minutes, as indicated by the following data pertinent to cracking catalysts which were prepared by procedures identical except for differences in mulling time.

| | 30 min. mull | 45 min. mull |
|---|---|---|
| Bulk density, kg./l | 0.844 | 0.841 |
| Crushing strength, kg | 14.5 | 12.5 |
| Ball mill hardness, percent | 93.2 | 91.7 |

Sometimes it is advantageous to slightly increase the water content of the plastic dough to accommodate to the differences amongst batches of partially mullitized kaolin or other variable component and to accommodate for variables such as humidity, and ambient temperature.

After a bed of granular particles has been formed in a tank, the tank is filled with a mineral oil having a high flash point and a viscosity comparable to a light lubricating oil. The particles age at a temperature conveniently designated as ambient temperature. Heat is generated by the reaction of the alkali and clay components and the aging oil may be circulated through a heat exchanger to maintain the temperature within the range (usually the upper portion thereof) from about 10° C. to about 40° C., which is substantially the same temperature range in the plant attributable to variations in the weather. Such aging at ambient temperature is continued for about 24 hours. A circulating pump directs the oil through a heat exchanger, where by the temperature of the granules is increased from ambient temperature to about 95° C. during a one hour period, and maintained at this temperature for about 24 hours. The oil is drained from the granules and transferred to storage. Residual oil is removed by treatment with ammonium nitrate solution, the pellet surfaces having a greater affinity for such solution than for oil. Each stage of ammonium exchange is conducted using about one molar ammonium nitrate (7.7% by weight or density of about 1.0317 g./ml.) at about 95° C. for about 2 hours, the ratio of ammonium ion to initially exchangeable sodium ion being about 0.5 to 1. After fourteen stages of such ammonium exchange, the sodium content (as $Na_2O$) was less than 1% by weight (maximum for manufacturing control) notwithstanding the 5.8% $Na_2O$ content of the composition subjected to aging. The ammonium ion exchange typically provides from about 0.5 to about 0.9% residual sodium compounds in the granules.

The ammonium treated particles are heat treated to prepare acidic aluminosilicate material which is further heated to stabilize the cracking catalyst. An atmosphere containing 50% steam at a temperature such as 800° C. for four hours is suitable for the final stabilization. The initial heating of the granules can be deemed to be a drying step, and may be conducted separately if desired. Similarly, intermediate stages of the heating can be deemed to be a deammoniation step, and may be conducted separately.

At elevated temperature, and especially in the presence of steam, any hydrogen zeolite (product remaining from mildest deammoniation of ammonium zeolite) undergoes transformations whereby its ion-exchange capacity is measurably decreased. It is customary to absorb quinoline vapor in measuring the acidity of a cracking catalyst instead of measuring aqueous ion exchange capacity but any such measurements indicate that for many decades the conventional manufacture of cracking catalyst by thermal treatment of ammonium zeolites has achieved significant decationization. Such decationization or decrease of ion exchange capacity has often been described by other terminology such as stabilizing the catalyst. Regardless of terminology, cracking catalysts have been treated for a few hours at an elevated temperature, generally in the presence of steam, at conditions more severe than contemplated cracking conditions for the purpose of assuring that the performance of the cracking catalyst would remain reasonably uniform throughout its contemplated life.

The steamed granules are permitted to cool to ambient temperature and stored prior to shipment to a petroleum refinery. At the refinery, the cracking catalyst particles are generally heated at conditions driving off sorbed moisture prior to use in the cracker, but there may be variations in the amounts of moisture in the catalyst particles between the times of stabilization and use. The catalyst particles have a sufficient large surface area to be sorptive and to sorb moisture from humid atmospheres. That cracking catalysts generally perform similarly to other solid drying agents during storage has been known for many years, so that appropriate precautions have been customary.

The results of the catalyst evaluation revealed that the catalyst had an attractive combination of properties.

Gasoline, vol. percent _____ 53.6
coke wt. percent _____ 2.6
gas, wt. percent _____ 16.7
gas gravity _____ 1.52
conv. wt. percent _____ 66.5
gasoline selectivity, wt. percent _____ 71.0
ball mill hardness, percent _____ 95.3
bulk density kg./l. _____ 0.852
$Na_2O$, wt. percent _____ 0.42

By a series of performance tests, it is established that such catalyst particles have a combination of properties arousing interest from refineries.

Cracking catalysts are manufactured and consumed on a large tonnage basis. Although such materials are useful as catalysts for other chemical reactions, as drying agents, or as sorbents, and/or as intermediates, the cracking catalyst terminology has proven most satisfactory for describing such materials.

EXAMPLE 2

Cracking catalyst particles are prepared following the same proportions as in connection with Example 1, except that the $H_2O/Al_2O_3$ unit ratio of the plastic dough was 6.38 instead of 5.80, that is, about 10% greater. The dough was extruded, cut, aged at room temperature, aged at about 90° C., washed, treated with ammonium nitrate solution, dried, deammoniated, stabilized in 50% steam at 840° C., cooled and evaluated. The ball mill hardness, air jet attrition hardness, and related physical properties closely resembled those for Example 1, as did the catalytic performance.

In the manufacture of many calcined clay products, the water content of the plastic dough prior to shaping of the dough is quite critical, making it difficult to control addition of water within the permissible range of imprecision. The discovery that catalyst having industrially acceptable properties was attainable even when the water content of the dough was 10% greater than the minimum necessary for extrudable plasticity was an impartant step in simplifying the control program contemplated for catalyst manufacture. Based upon the weight of the plastic dough, the water content should be regulated with a precision of plus or minus about 2%, but even this range of imprecision is wider than might be expected in attaining reproducible attrition characteristics in a calcined product.

EXAMPLE 3

The proportions of clay-type ingredients are best described by setting forth the amounts of the corresponding anhydrous materials. The weight loss upon high temperature calcining at about 980° C. subsequent to drying at about 105° C. provides a measure of the hydrate water content. Plastic kaolin contains 13–25% hydrate water, thus differing from the 0.3–2% hydrate water content of meta kaolin or the less than 0.3% hydrate water content of partially mullitized kaolin. As long as the recrystallization steps provide large pore zeolitic products, various substitutions for the exemplified clay-type ingredients are contemplated. Best results in the recrystallization step require control of the composition of the aqueous alkaline aluminosilicate mixture, and the following limits for the proportions of the clay-type ingredients are set forth:

|  | Hydrate water content | Anhydrous material concentration |
| --- | --- | --- |
| Clay-type ingredient: |  |  |
| Principal | 13–25 | 55–70 |
| Calcined | <0.3 | 20–40 |
| Minor | 0.3–2 | 4–19 |
| Total, percent |  | 100 |

The mixture of clay-type ingredients is combined with an alkaline aqueous solution by high pressure mixing to form a plastic dough prior to particle formation, and the present invention is particularly concerned with such high pressure mixing. The amount of water in the alkaline aqueous aluminosilicate dough is controlled to be sufficient to permit plasticity but less than would impart adhesiveness to the oil immersed particles. Silica and alumina are the refractory oxide components of the dough. The amount of water is desirably such that the unit mole ratio of water to moles of alumina is within the range from 5 to 8. The range for the unit ratio for the number of moles of alkaline cation to aluminum ion is from about 2 to 6.

A plastic dough may be prepared consisting essentially of 84 grams halloysite clay (a plastic kaolin type of clay containing about 23% hydrate water), 21 grams tetramethyl ammonium hydroxide, 9 grams gamma alumina containing about 0.9% volatile matter, and thus being in the 0.3 to 2% range, 21 grams calcined diatomaceous earth containing less than 0.3% volatile matter, and 27 grams water and shaped into particles for the zeolitic recrystallization procedure. Said composition provides an aluminum ion to alkaline cation unit ratio of 3.1 and a water to alumina mole unit ratio of 7.1 and a $SiO_2/Al_2O_3$ mole unit ratio of 2.5.

Although significant variation in the composition of the plastic dough is permissible, the dough must be extruded, and the precursor particles must be recrystallized by aging in oil bath, first at about ambient and then at an elevated temperature such as 80–120° C., each aging being for from 8 to 40 hours. Ion exchange steps are not necessary when a quaternary base is used instead of sodium hydroxide. Drying and deammoniating of the ammonium (quaternary derivatives being designed as ammonium in its generic sense) zeolite particles must be followed by stabilization in an atmosphere containing 30–100% steam at a temperature in the 750–850° C. range for from 1 to 6 hours, after which the cracking catalyst particles are cooled and stored before use as a catalyst for preparing gasoline from hydrocarbons boiling above the gasoline range.

Obviously many modifications and variations of the invention as hereinbefore set forth may be made without departing from the spirit and scope thereof, and therefore only such limitations should be imposed as are indicated in the appended claims.

The invention claimed is:

1. In the method of preparing an aluminosilicate cracking catalyst in which a dry mixture is prepared in which the proportions of anhydrous refractory oxide material provide about 55–70% plastic kaolin-type clay containing 13–25% hydrate water, about 20–40% of calcined refractory oxide containing less than about 0.3% hydrate water, and about 4–19% of reactive refractory oxide containing hydrate water in the range from 0.3% to 2%, in which the aluminosilicate mixture is mixed with an alkaline solution to provide a unit ratio of aluminum ion to alkaline cation from 2 to 6 and unit ratio of moles of water to moles of alumina from 5 to 8, in which particles are formed comprising aqueous alkaline aluminosilicate, in which the particles are immersed in an oil bath for aging for from about 16 to 32 hours at about ambient temperature and about 8 to 40 hours at about 80° to about 120° C. to produce particles comprising crystalline zeolite, in which such particles are ion-exchanged to form particles comprising crystalline ammonium zeolite, in which said particles comprising ammonium zeolite are thermally deammoniated, stabilized by treatment with an atmosphere containing from about 30% to 100% steam at a temperature in the range from about 750° C. to about 850° C., and the particles are cooled to provide cracking catalyst particles, the improvement which consists of subjecting the alkaline aqueous aluminosilicate to high-pressure mixing in a muller having a pressure roller, crushing components against the bottom of the pan said high-pressure mixing being of critical marginal effectiveness as compared with pug milling in continuously, reliably preparing a plastic dough by the squeezing together of the components; and continuously, reliably extruding the particles from such plastic dough prior to aging.

2. A method of preparing an aluminosilicate cracking catalyst which consists of preparing a dry mixture in which the proportions of anhydrous refractory oxide material provide about 55–70% plastic kaolin-type clay containing 13–25% hydrate water, about 20–40% of calcined refractory oxide containing less than about 0.3% hydrate water, and about 4–19% of reactive refractory oxide containing hydrate water in the range from 0.3% to 2%; mixing such dry mixture with an alkaline solution to provide a unit ratio of aluminum ion to alkaline cation from 2 to 6 and unit ratio of moles of water to moles of alumina from 5 to 8; subjecting the resulting alkaline aqueous aluminosilicate to high-pressure mixing by a mulling operation in a muller having a pressure roller crushing components against the bottom of the pan and for from about 5 to 50 minutes, said mulling being more effective than pug milling by reason of the marginal effectiveness in continuously, reliably squeezing together the components into a plastic dough; extruding pellets from such plastic dough, said extrusion being continuously reliable by reason of said mulling; converting such extruded pellets into particles corresponding in shape generally to that desired for the cracking catalyst particles; immersing the particles in an oil bath for aging for from about 16 to 32 hours at about ambient temperature and about 8 to 40 hours at about 80° to about 120° C. to produce particles comprising crystalline zeolite having alkaline cations; treating the crystalline zeolite by ion-exchange to produce particles comprising crystalline ammonium zeolite; thermally deammoniating and stabilizing particles in an atmosphere containing from about 30% to 100% steam at a temperature in the range from about 750° C to about 850° C.; and cooling the steam-stabilized particles to provide cracking catalyst particles.

References Cited

UNITED STATES PATENTS

| | | | |
|---|---|---|---|
| 3,310,373 | 3/1967 | Johnson | 252—455 X |
| 3,323,876 | 6/1967 | Arey et al. | 252—455 X |
| 3,324,048 | 6/1967 | Plank et al. | 252—455 |
| 3,367,886 | 2/1968 | Haden et al. | 252—455 |
| 3,367,887 | 2/1968 | Haden et al. | 252—455 |

DANIEL E. WYMAN, Primary Examiner

C. F. DEES, Assistant Examiner

PO-1050
(5/69)

UNITED STATES PATENT OFFICE
CERTIFICATE OF CORRECTION

Patent No. 3,533,962    Dated October 13, 1970

Inventor(s) Lee A. Cosgrove

It is certified that error appears in the above-identified patent and that said Letters Patent are hereby corrected as shown below:

Column 2, line 1, "sufficient" should read --sufficiently--

Column 3, line 25 "posses" should read --possess--

Column 4, line 11 "pre-heaer" should read --pre-heater--

Column 4, line 24 after "gasoline" insert --. The heat is applied at a rate such that the gasoline--

Column 5, line 24 "$Al_2O_2$" should read --$Al_2O_3$--

Column 5, line 30 after "range" insert --from--

Column 5, line 52 after "by" insert --weight--

Column 8, line 42 change spelling of "impartant" to --important--

Column 9, line 35 "designed" should read --designated--

Signed and sealed this 15th day of February 1972.

(SEAL)
Attest:

EDWARD M. FLETCHER, JR.
Attesting Officer

ROBERT GOTTSCHALK
Commissioner of Patents